United States Patent
Yang et al.

(10) Patent No.: US 9,582,089 B2
(45) Date of Patent: Feb. 28, 2017

(54) INPUT DEVICE, TOUCH SCREEN, AND USER DEVICE

(71) Applicant: Lenovo (Beijing) Limited, Beijing (CN)

(72) Inventors: Guang Yang, Beijing (CN); Chao Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 50 days.

(21) Appl. No.: 14/227,905

(22) Filed: Mar. 27, 2014

(65) Prior Publication Data

US 2015/0042574 A1 Feb. 12, 2015

(30) Foreign Application Priority Data

Aug. 12, 2013 (CN) .......................... 2013 1 0349415

(51) Int. Cl.
- *G06F 3/041* (2006.01)
- *G06F 3/044* (2006.01)
- *G06F 3/046* (2006.01)

(52) U.S. Cl.
CPC .............. *G06F 3/041* (2013.01); *G06F 3/044* (2013.01); *G06F 3/046* (2013.01); *G06F 2203/04106* (2013.01)

(58) Field of Classification Search
CPC .................................. G06F 3/044; G06F 3/046
See application file for complete search history.

(56) References Cited

U.S. PATENT DOCUMENTS

| | | | | |
|---|---|---|---|---|
| 2011/0227588 A1* | 9/2011 | Chen | ....................... | G06F 3/044 324/654 |
| 2011/0298748 A1* | 12/2011 | Chen | ....................... | G06F 3/044 345/174 |
| 2012/0169400 A1* | 7/2012 | Liu | ........................ | G06F 3/0416 327/517 |
| 2012/0276957 A1* | 11/2012 | Yang | .................... | H04M 1/0266 455/566 |

* cited by examiner

*Primary Examiner* — Viet Pham
*Assistant Examiner* — Christopher Kohlman
(74) *Attorney, Agent, or Firm* — Schwegman Lundberg & Woessner, P.A.

(57) ABSTRACT

In an embodiment of the present invention, there provides an input device, a touch screen, and a user device, in order to increase the sensitivity of signal detection. The present invention relates to the field of signal detection. The input device comprises: a detection unit, a controller, and at least two sensors, wherein the detection unit corresponds to the at least two sensors, the at least two sensors are connected to the controller, and the at least two sensors correspond to at least two input types of the input device. The detection unit is configured to detect an input signal. The sensors are configured to determine the corresponding input type of the input signal after receiving the input signal detected by the detection unit. The controller is configured to control connections and disconnections between the at least two sensors and the detection unit. The embodiment of the present invention is used for signal detection.

7 Claims, 3 Drawing Sheets

INPUT DEVICE, TOUCH SCREEN, AND USER DEVICE

RELATED APPLICATIONS

This application claims the benefit of priority under 35 U.S.C. Section 119, to Chinese Patent Application Serial No. 201310349415.5 filed on Aug. 12, 2013, which application is incorporated herein by reference in its entirety.

BACKGROUND OF THE INVENTION

1. Field of the Invention

The present invention relates to a field of signal detection, and particularly to an input device, a touch screen, and a user device.

2. Description of the Related Art

The existing terminal input device generally includes two input types, i.e., a capacitive signal input and an electromagnetic signal input. The capacitive signal input corresponds to a capacitive detection unit capable of detecting an inputted capacitive signal, while the electromagnetic signal input corresponds to an electromagnetic detection unit capable of detecting an inputted electromagnetic signal. The capacitive detection unit and the electromagnetic detection unit can be arranged in an up-down direction and are respectively connected to a capacitive sensor and an electromagnetic sensor in the input device. When the input device is powered on, the capacitive sensor and the electromagnetic sensor are simultaneously activated so that the input device can detect the capacitive signal and the electromagnetic signal simultaneously.

However, since the capacitive sensor and the electromagnetic sensor are simultaneously activated, the capacitive detection unit and the electromagnetic detection unit detect an input signal simultaneously, thereby causing mutual interference during signal detection and reducing sensitivity of signal detection.

SUMMARY OF THE INVENTION

In embodiments of the present invention, there provides an input device, a touch screen, and a user device, in order to increase the sensitivity of signal detection.

In accordance with an aspect of the present invention, there is provided an input device comprising: a detection unit, a controller, and at least two sensors, wherein the detection unit corresponds to the at least two sensors, the at least two sensors are connected to the controller, and the at least two sensors correspond to at least two input types of the input device;

the detection unit is configured to detect an input signal;

the sensors are configured to determine the corresponding input type of the input signal after receiving the input signal detected by the detection unit; and the controller is configured to control connections and disconnections between the at least two sensors and the detection unit.

In accordance with another aspect of the present invention, there is provided a touch screen comprising the above-mentioned input device.

In accordance with a further aspect of the present invention, there is provided a user device comprising the above-mentioned touch screen.

In the present invention, a single detection unit is disposed in the input device and corresponds to at least two sensors. Therefore, the input signal is detected by the detection unit during signal detection and the corresponding input type is determined by the sensors. As a result, the input device and the touch screen according to the embodiments of the present invention avoid mutual interference between a plurality of detection units, increasing sensitivity of signal detection.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF THE EMBODIMENTS

The preferable embodiments of the present invention will now be described with reference to the accompanying drawings. It should be understood that the preferable embodiments set forth herein are only used to describe and explain the present invention and the present invention is not limited to the embodiments. It will be understood by those skilled in the art that modifications to the following embodiments may be made. All of the modifications made without departing from the principles and spirit of the present invention should fall within the protection scope of the present invention.

Figure 1:
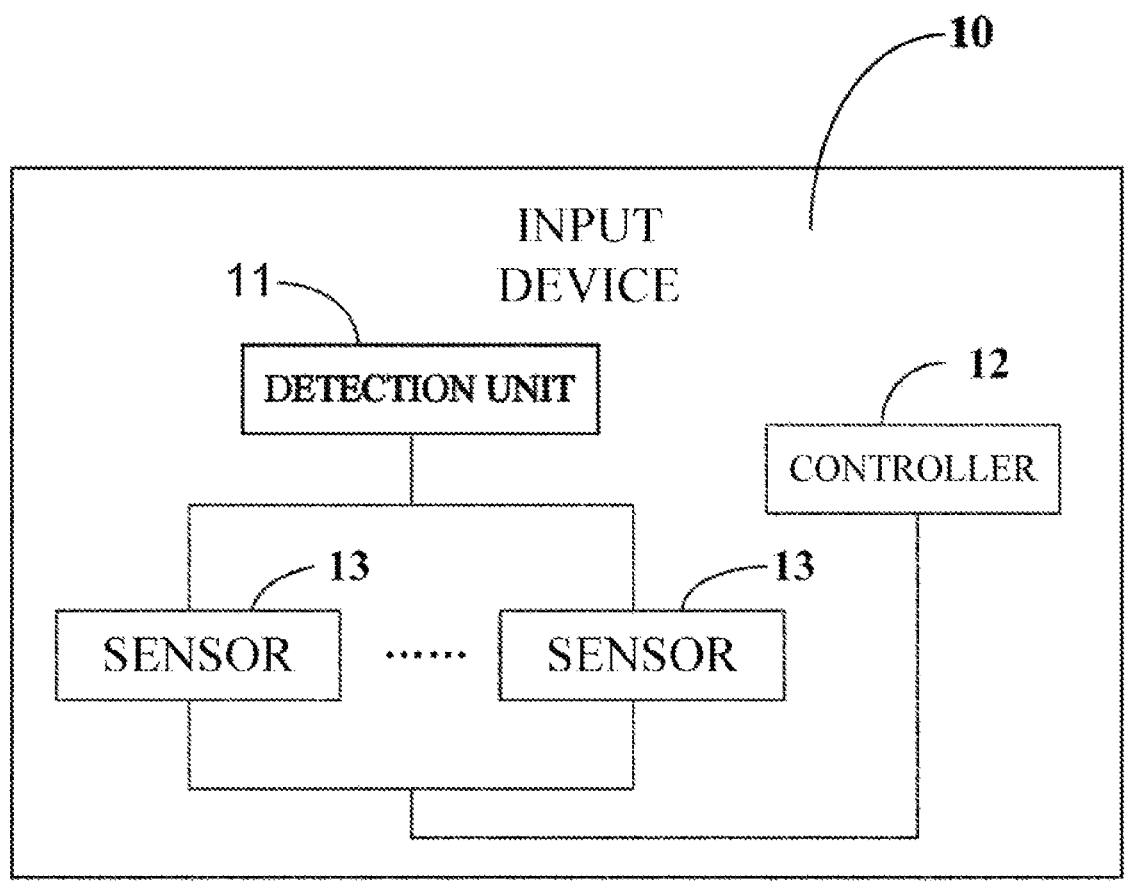
FIG. 1 is a schematic diagram showing a structure of an input device according to an embodiment of the present invention.

In an embodiment of the present invention, there provides an input device 10. As shown in FIG. 1, the input device 10 comprises a detection unit 11, a controller 12, and at least two sensors 13.

The detection unit 11 corresponds to the at least two sensors 13, the at least two sensors 13 are connected to the controller 12, and the at least two sensors 13 correspond to at least two input types of the input device.

The detection unit 11 is configured to detect an input signal.

Specifically, the input signal may be a signal inputted by a user by means of a finger or a stylus. Generally, the signal inputted by a user by means of the finger is a capacitive signal, while the signal inputted by a user by means of the stylus is an electromagnetic signal.

Alternatively, the detection unit 11 may be formed by arranging transparent electric conducting material in lines and rows and may have a net-shaped structure. The transparent electric conducting material may be an indium tin oxide (ITO) or a metal mesh. However, the present invention is not limited. The detection unit is specifically configured to detect an input signal by the transparent electric conducting layer.

The sensors 13 are configured to determine the corresponding input type of the input signal after receiving the input signal detected by the detection unit 11.

The controller 12 is configured to control connections and disconnections between the at least two sensors 13 and the detection unit 11.

Specifically, the controller is configured to control connections and disconnections between the at least two sensors and the detection unit in the following two manners.

In the first manner, a connecting switch is disposed between the sensors and the detection unit. The controller can control connections and disconnections between the at least two sensors and the detection unit by controlling opening and closing of the connecting switch directly.

In the second manner, the connecting switch may be disposed within the at least two sensors. The controller controls opening and closing of the connecting switch within the sensors by sending a control signal to the sensors, thereby controlling connections and disconnections between the at least two sensors and the detection unit.

In a possible embodiment of the present invention, the controller 12 is specifically configured to switch connections between the at least two sensors and the detection unit, and to receive an input type determined message sent by a first one of the at least two sensors after connection between the first sensor and the detection unit is established and the first sensor receives the input signal, and to retain the connection between the first sensor and the detection unit after receiving the input type determined message.

Furthermore, the controller 12 is specifically configured to switch connections between the at least two sensors and the detection unit according to a first preset time.

For example, the at least two sensors comprise a first sensor, a second sensor, and a third sensor, and the first preset time is 2 ms. The first sensor is connected to the detection unit after the input device is powered on. Then, after 2 ms elapse, the controller switches the connection between the first sensor and the detection unit to connection between the second sensor and the detection unit. After that, after another 2 ms elapse, the controller switches the connection between the second sensor and the detection unit to connection between the third sensor and the detection unit. Next, after still another 2 ms elapse, the controller switches the connection between the third sensor and the detection unit back to the connection between the first sensor and the detection unit. The controller cyclically performs the switching in the above manner after the next 2 ms elapse again. One of the sensors sends an input type determined message to the controller when receiving an input signal, and the controller retains the connection between the one (the first) sensor and the detection unit after receiving the input type determined message. The example is only an exemplary embodiment, and the present invention is not limited to the embodiment.

Further, the controller may be further configured to operate in the following two manners after receiving the input type determined message and retaining the connection between the first sensor and the detection unit.

In the first manner, the controller 12 is specifically configured to retain the connection between the first sensor and the detection unit within a second preset time after receiving the input type determined message.

Furthermore, the controller 12 is also configured to switch the connection between the first sensor and the detection unit to the connection between a second one of the at least two sensors and the detection unit after the second preset time elapses.

The second preset time is greater than the first preset time.

Specifically, the controller prolongs a time of connection between any one of the sensors and the detection unit from the first preset time to the second preset time after receiving the input type determined message sent by the any one of the sensors, and the controller continues to switch the connections between the at least two sensors and the detection unit after the second preset time elapses.

In the second manner, the controller 12 is also configured to stop switching of the connections between the at least two sensors and the detection unit after receiving the input type determined message, and to restart switching of the connections between the at least two sensors and the detection unit when not receiving the input type determined message.

It should be noted that the first manner and the second manner differ from each other in that, in the first manner, the controller retains the connection between the sensor and the detection unit after receiving the input type determined message sent by the sensor, and switches the connections after the second preset time elapses; and in the second manner, the controller retains the connection between the sensor and the detection unit after receiving the input type determined message sent by the sensor, and switches the connections when not receiving the input type determined message later.

In another possible embodiment of the present invention, the detection unit 11 comprises at least two detection regions corresponding to the at least two sensors.

The controller 12 is specifically configured to establish connections between the at least two sensors and the detection unit such that the at least two sensors respectively determine the corresponding input types in the at least two detection regions by means of the detection unit.

Specifically, since the different sensors correspond to the different detection regions, the different detection regions detect the input types of the corresponding input signals, respectively. As can be seen, although detection of different input types of input signals is achieved by means of the same detection unit, mutual interference between the signals will not be caused since the different detection regions detect only the corresponding input types of input signals.

It should be noted that the at least two input types comprise a capacitive signal input and an electromagnetic signal input, and the corresponding at least two sensors comprise a capacitive sensor and an electromagnetic sensor.

With the above input device, a single detection unit is disposed in the input device and corresponds to at least two sensors. Therefore, the input signal is detected by the detection unit during signal detection and the corresponding input type is determined by the sensors. As a result, mutual interference between a plurality of detection units is avoided, and thus sensitivity of signal detection is increased.

Figure 2:
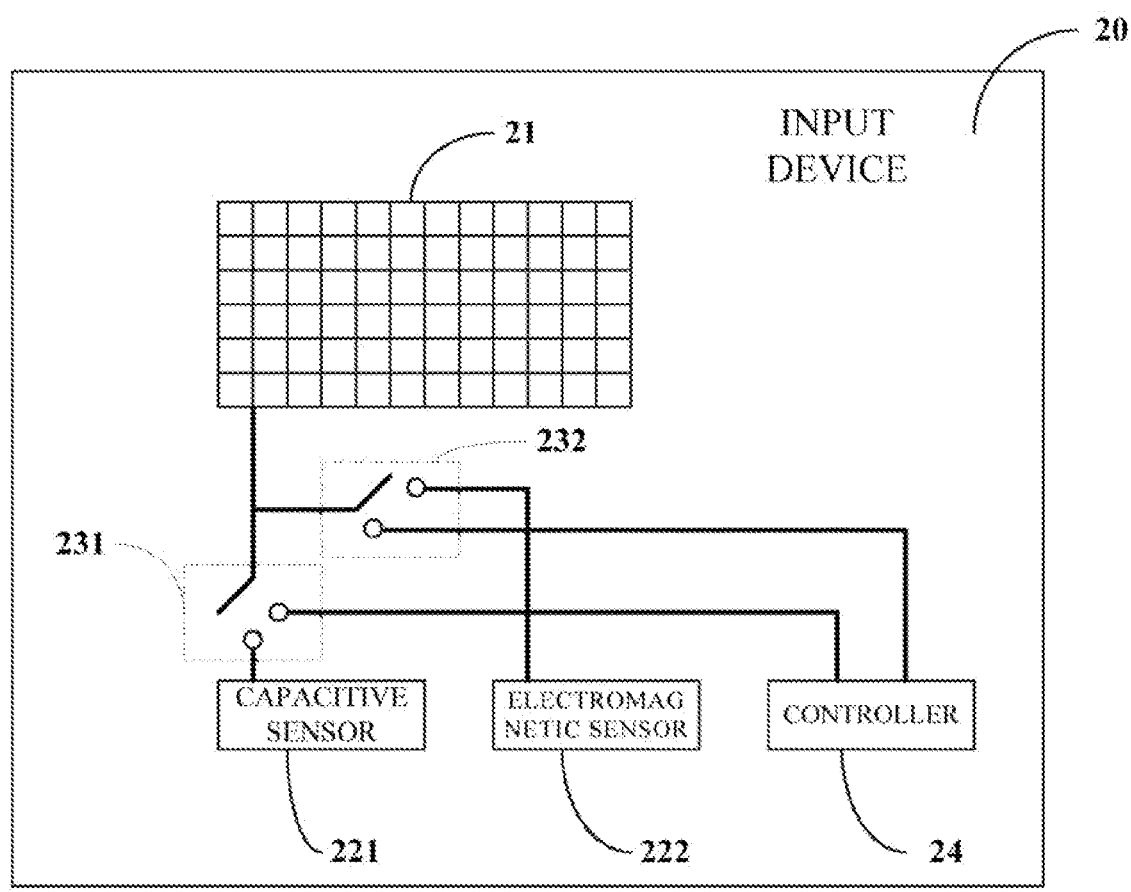
FIG. 2 is a schematic diagram showing a structure of an input device according to another embodiment of the present invention.

In an embodiment of the present invention, there provides an input device 20. As shown in FIG. 2, in the embodiment of the present invention, the input device 20 comprises: a detection unit 21 formed of a metal grid, a capacitive sensor 221, an electromagnetic sensor 222, a first connecting switch 231 between the capacitive sensor 221 and the detection unit 21, a second connecting switch 232 between the electromagnetic sensor 222 and the detection unit 21, and a controller 24 for controlling openings and closings of the first connecting switch 231 and of the second connecting switch 232.

In an possible embodiment of the present invention, after the input device is powered on, the controller controls connections and disconnections between the capacitive sensor and the detection unit and between the electromagnetic sensor and the detection unit by the first connecting switch and the second connecting switch, thereby switching connections between the capacitive and electromagnetic sensors and the detection unit.

Specifically, the controller can turn the first connecting switch in a closed state and the second connecting switch in an open state so that the capacitive sensor is connected to the detection unit and the electromagnetic sensor is disconnected from the detection unit. In this case, the input device can detect only a capacitive input signal and cannot detect an electromagnetic input signal. After a first preset time elapses, the controller switches the first connecting switch from the closed state to an open state, and the second connecting switch from the open state to a closed state so that the capacitive sensor is disconnected from the detection unit and the electromagnetic sensor is connected to the detection unit. In this case, the input device can detect only the electromagnetic input signal and cannot detect the capacitive input signal. Then, after the first preset time elapses, the controller switches the first connecting switch to the closed state, and the second connecting switch to the open state again so that the capacitive sensor is connected to the detection unit and the electromagnetic sensor is disconnected from the detection unit. Subsequently, the controller continues to switch openings and closings of the first connecting switch and of the second connecting switch according to the first preset time to switch the connections between the capacitive and electromagnetic sensors and the detection unit according to the first preset time until the controller receives a capacitive signal input determined message sent by the capacitive sensor (the controller may also receive an electromagnetic signal input determined message sent by the electromagnetic sensor, and here the capacitive signal input determined message is taken as an example and the present invention is not limited thereto). In this case, the controller can stop switching of the connections between the capacitive and electromagnetic sensors and the detection unit, and retains the connection between the capacitive sensor and the detection unit and disconnects the connection between the electromagnetic sensor and the detection unit. In this way, the input device can detect a capacitive signal inputted by a user. Since the electromagnetic sensor is disconnected from the detection unit, interference to the input device during capacitance signal detection is avoided and detection sensitivity is improved.

It should be noted that when the user stops inputting the capacitive signal, i.e., the capacitive sensor stops sending the capacitive signal input determined message to the controller, the controller restarts switching of the connections between the capacitive and electromagnetic sensors and the detection unit until the controller receives the input type determined message sent by the capacitive sensor or the electromagnetic sensor again.

In addition, the first preset time is much less than a time during which a user inputs a signal by the input device. For example, the preset time may have the order of millisecond. Therefore, it is ensured that any of the capacitive sensor and the electromagnetic sensor can determine the input type of the input signal.

In another possible embodiment of the present invention, the detection unit comprises a capacitive detection region and an electromagnetic detection region. The capacitive detection region corresponds to the capacitive sensor and the electromagnetic detection region corresponds to the electromagnetic sensor. The capacitive detection region is capable of detecting a capacitive signal, and the electromagnetic detection region is capable of detecting an electromagnetic signal.

Figure 3:
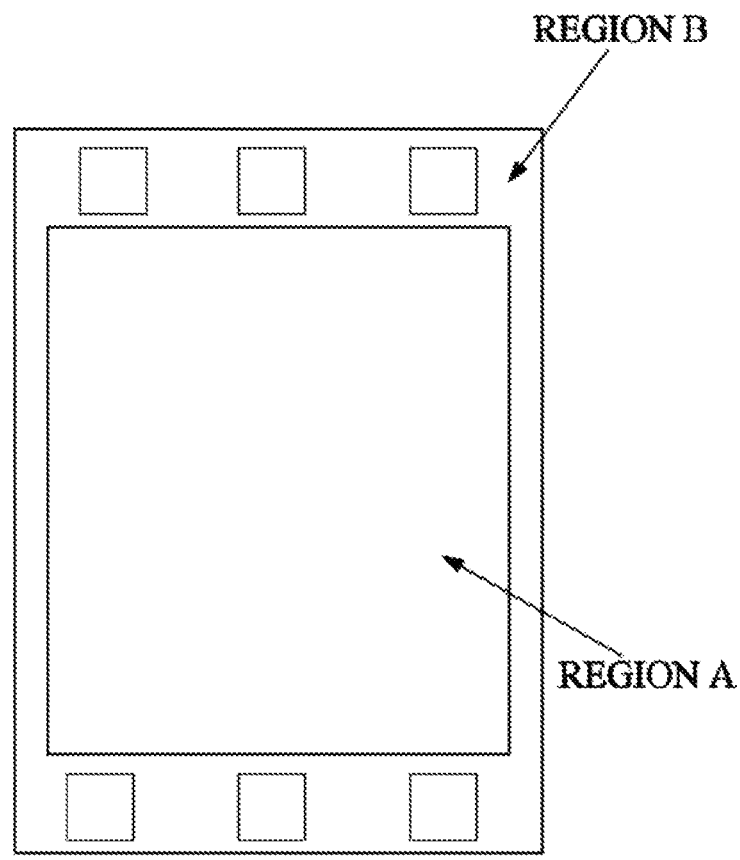
FIG. 3 is a schematic diagram of a touch screen according to an embodiment of the present invention.

FIG. 3 is a schematic diagram of a touch screen. The touch screen comprises a detection unit (not shown). The detection unit 31 comprises a capacitive detection region (not shown) and an electromagnetic detection region (not shown). The electromagnetic detection region corresponds to a region A of the touch screen, and detects the electromagnetic signal through the region A. The capacitive detection region corresponds to a region B of the touch screen, and detects the capacitive signal through the region B. For example, a user may perform operations, such as drawing, that require a higher detection accuracy in the region A by a stylus, and achieve other functions in the region B by operations such as touch, thereby satisfying different requirements of the user and improving user experience.

It should be noted that although detections of the capacitive signal and of the electromagnetic signal are simultaneously achieved by the same detection unit, mutual interference between the signals during detection will not be caused since the capacitive detection region detects only the capacitive signal and the electromagnetic detection region detects only the electromagnetic signal.

In the abovementioned input device, a single detection unit is disposed in the input device and corresponds to the capacitive sensor and the electromagnetic sensor. Therefore, the input signal is detected by the detection unit during signal detection and the corresponding input type is determined by the capacitive sensor or the electromagnetic sensor. As a result, mutual interference between a plurality of detection units is avoided, and thus sensitivity of signal detection is increased.

Figure 4:
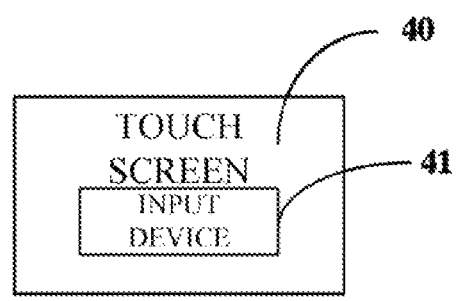
FIG. 4 is a schematic diagram showing a structure of another touch screen according to an embodiment of the present invention.

Further, in an embodiment of the present invention, there provides a touch screen 40. As shown in FIG. 4, the touch screen comprises the input device 10 shown in FIG. 1.

In addition, the present invention also provides a user device comprising the touch screen 40 shown in FIG. 4.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An input device comprising: a detection unit, a controller, and at least two sensors, wherein the detection unit corresponds to the at least two sensors, the at least two sensors are connected to the controller, and the at least two sensors correspond to at least two input types of the input device,
   the detection unit is configured to detect an input signal,
   the sensors are configured to determine the corresponding input type of the input signal after receiving the input signal detected by the detection unit, and
   the controller is configured to control connections and disconnections between the at least two sensors and the detection unit,
   wherein the controller is specifically configured to switch connections between the at least two sensors and the detection unit, and to receive an input type determined message sent by a first one of the at least two sensors after connection between the first sensor and the detection unit is established and the first sensor receives the input signal, and to retain the connection between the first sensor and the detection unit after receiving the input type determined message,
   wherein the controller is specifically configured to switch the connections between the at least two sensors and the detection unit according to a first preset time, wherein the controller is specifically configured to retain the connection between the first sensor and the detection unit within a second preset time after receiving the input type determined message;

the controller is also configured to switch the connection between the first sensor and the detection unit to the connection between a second one of the at least two sensors and the detection unit after the second preset time elapses; and the second preset time is greater than the first preset time.

2. The input device of claim 1, wherein the detection unit is formed by arranging transparent electric conducting material in lines and rows and has a net-shaped structure, and the detection unit is specifically configured to detect an input signal by a transparent electric conducting layer formed of transparent electric conducting material.

3. The input device of claim 2, wherein the detection unit comprises at least two detection regions corresponding to the at least two sensors; and the controller is specifically configured to establish connections between the at least two sensors and the detection unit such that the at least two sensors respectively determine the corresponding input types in the at least two detection regions by means of the detection unit.

4. The input device of claim 1, wherein the detection unit comprises at least two detection regions corresponding to the at least two sensors; and the controller is specifically configured to establish connections between the at least two sensors and the detection unit such that the at least two sensors respectively determine the corresponding input types in the at least two detection regions by means of the detection unit.

5. The input device of claim 1, wherein the at least two input types comprise a capacitive signal input and an electromagnetic signal input, and the at least two sensors comprise a capacitive sensor and an electromagnetic sensor.

6. A touch screen comprising the input device according to claim 1.

7. A user device comprising the touch screen according to claim 6.

* * * * *